United States Patent
Aviles

(10) Patent No.: US 8,103,764 B2
(45) Date of Patent: Jan. 24, 2012

(54) METHOD AND APPARATUS FOR MATCHING TRIGGER PATTERN

(75) Inventor: Joaquin J. Aviles, Austin, TX (US)

(73) Assignee: CacheIQ, Inc., Austin, TX (US)

(*) Notice: Subject to any disclaimer, the term of this patent is extended or adjusted under 35 U.S.C. 154(b) by 578 days.

(21) Appl. No.: 12/250,731

(22) Filed: Oct. 14, 2008

(65) Prior Publication Data

US 2010/0095064 A1 Apr. 15, 2010

(51) Int. Cl.
*G06F 15/16* (2006.01)
*G02B 6/00* (2006.01)

(52) U.S. Cl. ........ 709/224; 709/203; 709/238; 711/118; 726/13; 726/22; 707/999; 707/6; 370/389; 370/395

(58) Field of Classification Search ............. 709/203, 709/224, 238; 726/13, 22; 707/999.006; 711/118; 370/389, 395
See application file for complete search history.

(56) References Cited

U.S. PATENT DOCUMENTS

| | | | |
|---|---|---|---|
| 6,175,874 B1* | 1/2001 | Imai et al. ..................... 709/238 |
| 6,430,184 B1* | 8/2002 | Robins et al. .................. 370/392 |
| 6,651,099 B1* | 11/2003 | Dietz et al. .................... 709/224 |
| 7,440,304 B1* | 10/2008 | Raj ............................ 365/49.1 |
| 7,492,771 B2* | 2/2009 | Basso et al. ............. 370/395.32 |
| 7,552,107 B2* | 6/2009 | Indeck et al. ......................... 1/1 |
| 7,783,654 B1* | 8/2010 | Sreenath ........................ 707/758 |
| 7,917,486 B1* | 3/2011 | Gupta et al. ................... 707/705 |
| 7,953,743 B2* | 5/2011 | Indeck et al. .................. 707/758 |
| 2001/0056417 A1* | 12/2001 | Cao et al. .......................... 707/3 |
| 2004/0151382 A1* | 8/2004 | Stellenberg et al. ........... 382/219 |
| 2005/0102392 A1* | 5/2005 | Bou-Ghannam et al. ...... 709/224 |
| 2005/0111446 A1* | 5/2005 | Greaves et al. ................ 370/389 |
| 2005/0135380 A1* | 6/2005 | Sahita et al. ............. 370/395.32 |
| 2006/0173831 A1* | 8/2006 | Basso et al. ......................... 707/3 |
| 2007/0183418 A1* | 8/2007 | Riddoch et al. ............... 370/389 |
| 2008/0071781 A1* | 3/2008 | Ninan et al. ....................... 707/6 |
| 2008/0097959 A1* | 4/2008 | Chen et al. ......................... 707/2 |
| 2008/0134234 A1* | 6/2008 | Deiss et al. ....................... 725/31 |
| 2008/0189784 A1 | 8/2008 | Mangione-Smith |
| 2008/0270399 A1* | 10/2008 | Feng et al. ........................ 707/6 |
| 2009/0012958 A1* | 1/2009 | Raj ................................... 707/6 |
| 2009/0100055 A1* | 4/2009 | Wang ................................ 707/6 |
| 2009/0262659 A1* | 10/2009 | Sturges et al. ................. 370/253 |
| 2010/0088756 A1* | 4/2010 | Balakrishnan et al. ......... 726/13 |

OTHER PUBLICATIONS

I. Sourdis et al., A Reconfigurable Perfect-Hashing Scheme for Packet Inspection, 2005 International Conference on Field Programmable Logic and Applications, Aug. 24-26, 2005.
I. Sourdis et al., Scalable Multi-Gigabit Pattern Matching for Packet Inspection, IEEE Transactions on Very Large Scale Integration (VLSI) Systems, vol. 16, Issue 2, Feb. 2008.
F. Burkowski, A Hardware Hashing Scheme in the Design of a Multiterm String Comparator, IEEE Transactions on Computers, vol. C-31, No. 9, Sep. 1982.

\* cited by examiner

*Primary Examiner* — Alina N. Boutah
(74) *Attorney, Agent, or Firm* — Hamilton & Terrile, LLP; Michael Rocco Cannatti

(57) ABSTRACT

A method, system and program are disclosed for accelerating data storage in a cache appliance that transparently monitors NFS and CIFS traffic between clients and NAS subsystems and caches files in a cache memory by using a perfect hashing memory index technique to rapidly detect predetermined patterns in received packet payloads and retrieve matching patterns from memory by generating a data structure pointer and index offset to directly address the pattern in the datagram memory, thereby accelerating evaluation of the packet with the matching pattern by the host processor.

20 Claims, 7 Drawing Sheets

METHOD AND APPARATUS FOR MATCHING TRIGGER PATTERN

BACKGROUND OF THE INVENTION

1. Field of the Invention

The present invention is directed in general to the field of packet inspection in a computer network. In one aspect, the present invention relates to a standalone cache memory device which is connected between one or more host machines and a storage device and which inspects packets to identify predetermined patterns which are used to implement predetermined caching policies.

2. Description of the Related Art

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where any one NAS device may be connected to a plurality of client storage devices. In part, this performance problem is caused by the lower cache hit rates that result from a combination of increased disk capacity and high-density mounting on the NAS storage device. The performance of conventional NAS devices is also impaired by the amount of CPU processing cycles that are required to process and search incoming storage requests that arrive as a plurality of data packets. For example, empirical testing has shown that data indexing operations in commercial off-the-shelf (COTS) server appliances consume 35% of the CPU cycles, TCP reassembly consumes 30% of the CPU cycles, patterning searching consumes 20% of the CPU cycles, and content matching consumes 10% of the CPU cycles. As a result, the COTS appliances can only process 1/5 of a Gigabit Ethernet connection.

While a number of solutions have been proposed to address these problems, they are, for a variety of reasons, not entirely satisfactory. For example, faster disk drives have been developed, but the increased disk drive access speeds are not enough to overcome the performance gap. Other solutions have proposed increasing the size and speed of the cache memory at the NAS device(s), but this results in increased costs in terms of expense, chip size and power consumption. Even with improvements in hardware performance speed, there remain data processing performance limitations associated with monitoring and routing packet data, especially in communication networks where there are a large number of potential connections. For example, a communication node in a large network which inspects and routes network transport packets or frames will typically be required to perform an extensive search of a large connection table (e.g., a 3 GB file that holds connection information for 1 M connections) to determine if the packet needs to be forwarded or not. And while there have been solutions proposed to expedite the connection table search process, such solutions can result in false positives and/or false negatives when the incoming packets are not efficiently and correctly inspected. Accordingly, there is a need for a system and method for improving the disk storage access time and/or network packet processing to overcome the problems in the art, such as outlined above. Further limitations and disadvantages of conventional solutions will become apparent to one of skill in the art after reviewing the remainder of the present application with reference to the drawings and detailed description which follow.

SUMMARY OF THE INVENTION

A high-performance, scalable, stand-alone intelligent cache appliance and methodology are provided which use a perfect hashing memory scheme to inspect incoming packets for predetermined patterns in the data content that are used to rapidly store and monitor NFS and CIFS traffic between clients and NAS subsystems in response to clients that make read and write requests for these files. When positioned between the storage clients and the NAS filers, the intelligent cache appliance intercepts all requests between the clients and filers and provides read and write cache acceleration by storing and recalling frequently used information. By snooping network protocol traffic state parameters and splicing connections between filers and clients, the intelligent cache appliance provides Open System Interconnect (OSI) transparency, thereby performing in the Ethernet network as a bump-in-the-wire. Instead of performing an extensive search of a large (e.g., 3 GB) data structure in memory to locate a predetermined pattern that is then used to determine if a connection is cached at the cache appliance, the cache appliance uses a perfect hashing memory scheme to generate a data structure pointer and index offset for quickly locating copies of the matching pattern in memory which are compared for verification and then used to determine if the storage request is handled by the cache appliance. In particular, when a flow is received, the entirety of the flow may be scanned and processed as it is received using a perfect hashing memory scheme to identify one or more predetermined patterns in the flow. When a matching pattern is detected, a data structure pointer (or ID) is generated that identifies a matching pattern (e.g., specifies a memory location in the host processor's local memory) which corresponds to a pattern in the received flow. In addition, an index is generated which, in combination with an n-tuple-based datagram address for the data payloads of a given sequence flow, specifies a memory location offset from the datagram address where the matched pattern is located in the datagram memory. Because the index generated from the perfect hashing match scheme is used to specify the starting location for the matching pattern in the datagram memory without requiring a search of the entire datagram memory, the overall algorithm may be referred to as a perfect hashing match index (PHMI) algorithm. With this approach, the location of the matching pattern in datagram memory is unique and deterministic, and is mathematically computed at a fixed processing cost that is much faster than the typical extensive search time. The PHMI approach may also be used to effectively filter incoming cache read/write requests by using a configurable hash tree which embodies an NFS/CIFS pattern set and which may be centrally stored and updated as needed so that the patterns which trigger the caching operations can be programmed and adjusted to optimize cache performance. If a pattern is detected in the received packet(s) that matches any of the trigger patterns embodied in the hash tree, the incoming cache read/write requests associated with the detected pattern may be allowed, or alternatively blocked, depending on the decision of a cache policy process applied by the host processor. In addition, by using the data structure pointer/ID and the index to retrieve separate copies of the matching pattern from the local memory and datagram memory, respectively, the retrieved patterns may be compared for verification purposes by the host processor before applying the cache policy process to the matching pattern.

In accordance with various embodiments, a data operation (such as a request to read or write a file from a networked storage device) may be adaptively cached or serviced by a non-disruptive storage cache appliance which uses packet inspection intelligence to splice connections under software control using the methodologies and/or apparatuses described herein, which may be implemented in a standalone cache appliance with computer program code comprising computer executable instructions. In whatever form implemented, the standalone cache unit includes a cache memory that caches data requested by a remote client and stores connection state information for each connection used to cache data in the cache memory. The cache unit also includes a packet processor for transparently splicing connections between the data storage devices and remote clients. The packet processor inspects network protocol traffic state parameters received on the I/O ports to determine if a request from a remote client can be serviced by the standalone cache unit. To determine if a connection request is to be cached at the cache appliance, packet inspection is performed by using a perfect hashing match index algorithm to perform un-anchored searches of the content in the packet payloads to identify predetermined patterns that describe the filer requests in a storage environment, such as by searching each network packet for predetermined paths, filenames, extensions and/or content. When a pattern match occurs, the data structure ID and index are generated to specify the memory location(s) for the pattern which is used by the cache appliance policy process to determine if the connection request should be cached. In this way, the disclosed perfect hashing match index scheme is used by the packet processor to quickly execute software that transparently monitors NFS and CIFS traffic between remote clients and NAS subsystems and that implements caching policies based on detected patterns in the traffic.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
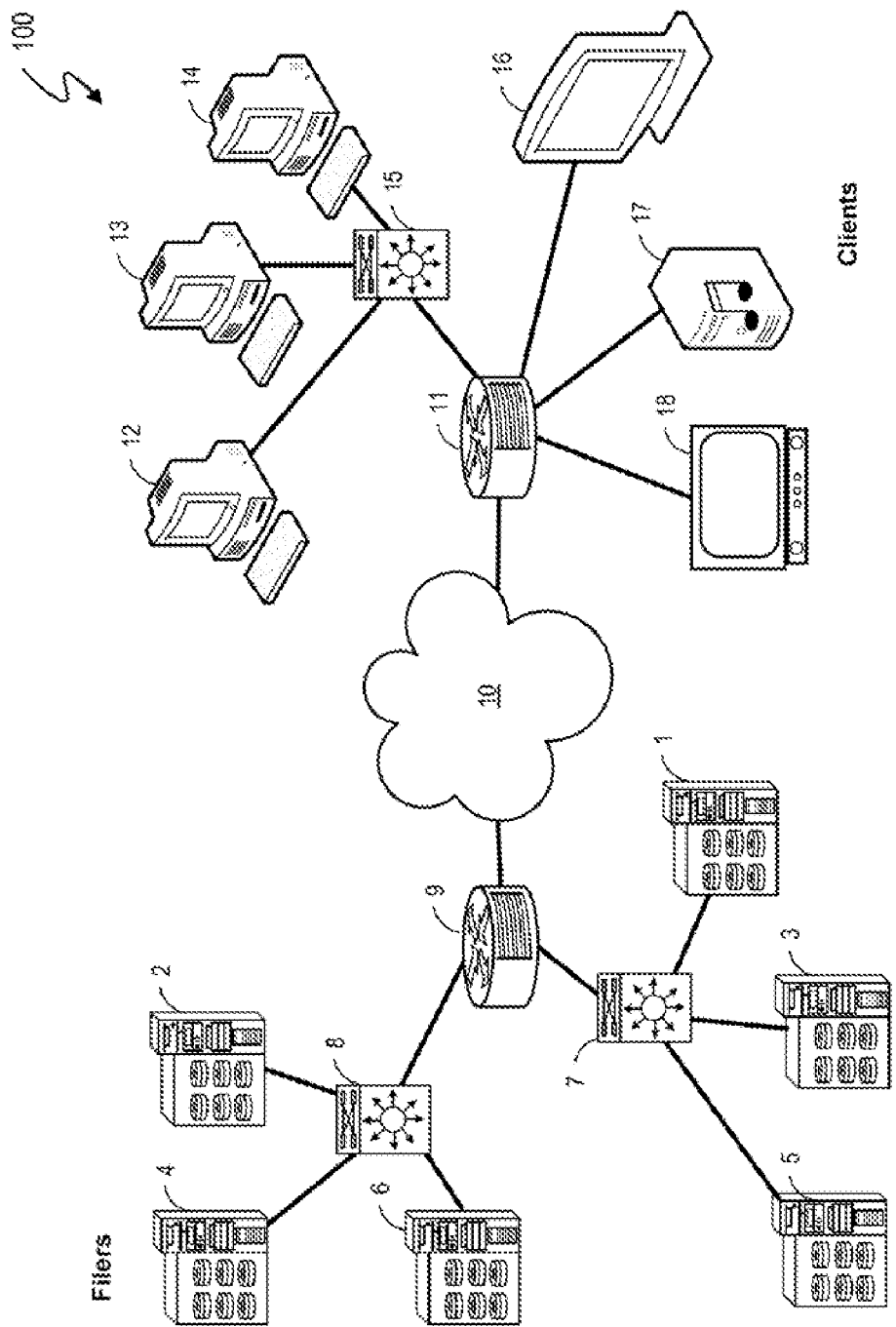
FIG. 1 depicts a typical NAS system in which client devices use a network to access storage resources on a number of remote network attached storage and file servers.

A method, system and program are disclosed for accelerating data storage access by caching selected data in a scalable, stand-alone cache appliance that transparently monitors NFS and CIFS traffic between clients and NAS subsystems and caches files using dynamically adjustable cache policies that reflect the business requirements and/or application workloads that change over time. In selected embodiments, one or more cache appliances may be connected or clustered together in front of an NAS filer (group) to provide low-latency access and redundancy in responding to both read and write requests for cached files, thereby improving access time to the data stored on the disk-based NAS filer (group). Instead of requiring the host processor/caching policy to find a matching pattern by searching the entirety of the data payloads associated with a given flow which includes a matching pattern, a perfect hashing memory scheme is used to rapidly identify and retrieve predetermined patterns in the data payloads by generating a data structure pointer and index offset to directly address the pattern in the datagram memory. When a predetermined set of trigger values or patterns (e.g., predetermined paths, filenames, extensions and/or content) are chosen to implement a particular caching policy, the trigger values/patterns are collected into a repository and used to generate a perfect hash tree table, such as by using a Merkle-type hashing function to compose a perfect hash from several sub-hashes of its subsets. Each trigger pattern identifies a characteristic of a filer request that can be used to determine if the filer request is cached at the cache appliance. Once the hash table, pattern map and pattern memory are populated with the required values, the cache appliance scans the data in each received network packet to parse and extract the data payload from the L5-L7 fields, as well as connection identifier information (e.g., the sequence number from the L4 field)

from each received network packet. The data payload is then scanned for patterns that match any of the target patterns by applying the perfect hash tree to selected subset of the incoming data bits to determine which pattern in the data payload is a possible match, reading the possible pattern from a pattern memory, and then performing a simple comparison of the possible pattern against the incoming data. If the hash hit or match occurs on the n-th payload byte of the m-th packet on the c-th flow, a data structure pointer (a.k.a., ID value) and/or index offset (a.k.a., index value) are generated that point directly to memory location of the matching pattern for use in determining if the storage request is handled by the cache appliance. For example, the data structure pointer (a.k.a., ID value) output from the hash table (or the pattern map or the actual pattern) is an identifier that indicates which matched pattern was found at the location of the last hit, and is used by the cache policy process to locate a copy of the matched pattern in the host processor's local memory. In another embodiment, the index offset (a.k.a., index value) is an address specifying the location of a matching pattern in the datagram memory for a particular data flow that is equal to the current sequence number "m" plus the offset "n" from the start of TCP payload to the first character of the matched pattern for any particular flow. In addition, the triggering patterns can be updated as desired to include or change the trigger pattern values so that an NFS/CIFS pattern set can be optimized over time. By using the perfect hashing memory scheme as described herein, the cache appliance(s) can rapidly store and retrieve pattern information from multi-GB non-volatile, inexpensive, low power cache memory that is used by the host processor for dynamically caching data in accordance with adjustable caching policies to reflect business requirements, to implement content matching algorithms and/or to reflect time-varying file access patterns, network utilization, file sizes and client load. The adjustable caching policies may be defined by the user as application profiles that identify application data sets and create policies that automate the management of those data sets in order to influence what files are to be cached and when. For example, application profiles may be used to identify a set of files that, when served from the cache appliance cluster, will increase the overall performance of the application by reducing or eliminating I/O bottlenecks. Application profiles may also be used to give higher caching priority to selected application data sets that have a positive impact on business, while giving lower caching priority to other application data sets. In addition, application profiles may be used to determine schedules for caching data sets from predetermined applications and/or to identify application clients whose application data sets are to be cached.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
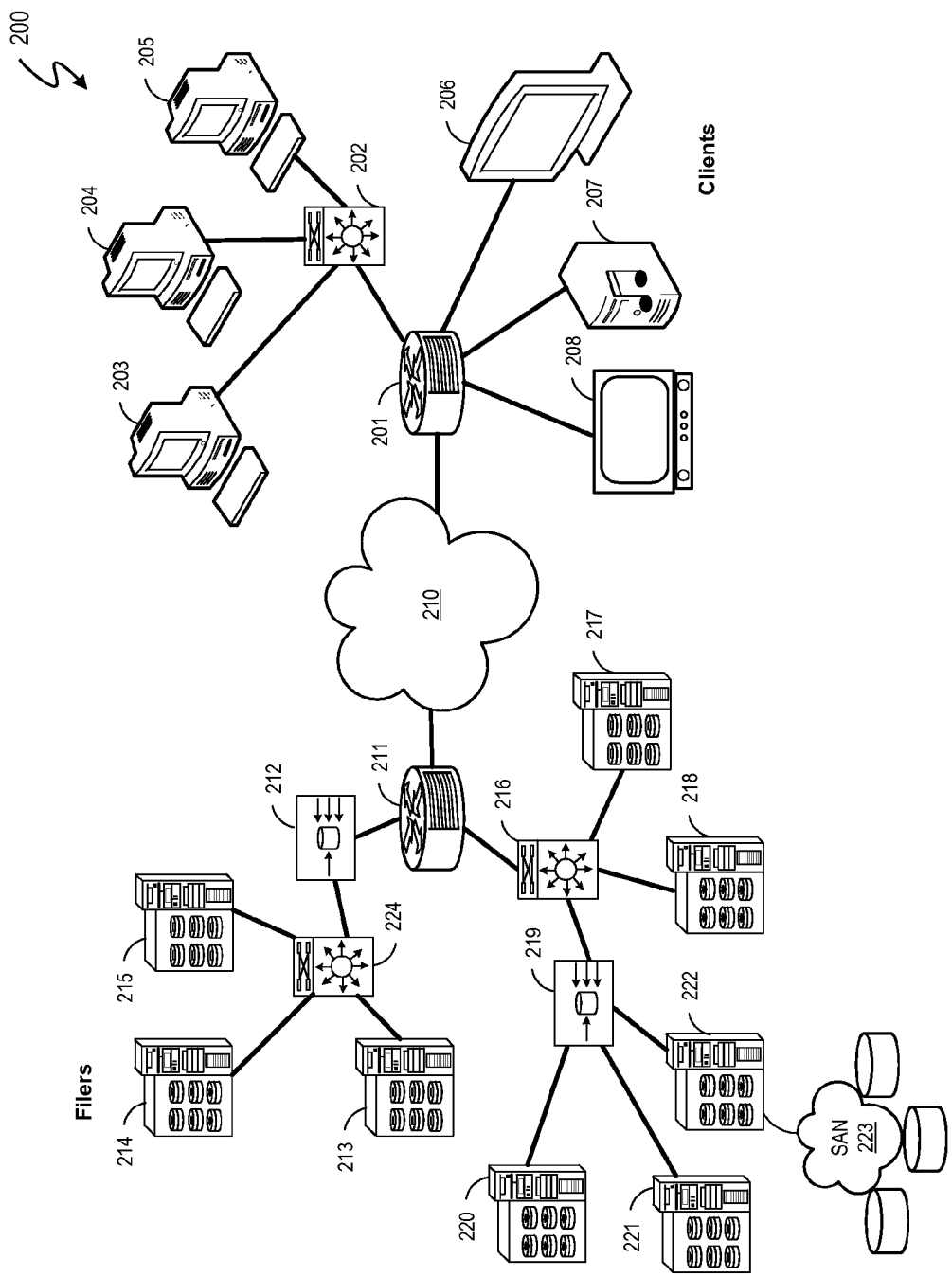
FIG. 2 depicts an enterprise storage network system in which one or more intelligent cache appliances may be located in front of a file server or a plurality of file servers.

Referring to FIG. 2, a diagram depicts an example enterprise storage network system 200 in which one or more intelligent cache appliances (e.g., 212, 219) may be located in front of a file server group (e.g., 213-215) or a file server (e.g., 222). The depicted storage network system 200 includes one or more storage clients, such as mobile or desktop PCs or workstations 203-205 or application servers 206-208. Each of the storage clients may run a separate application which requires access to remotely-stored application data. When the application data is stored in one of the NAS filers, the storage client sends a read or write request over the network 210 using the appropriate routers 201, 211 and/or switches 202, 216, 224. Such requests may be sent to the destination NAS filer using an appropriate IP-based network protocol, such as CIFS or NFS. However, when an intelligent cache appliance is installed in-line between the storage clients and a destination NAS filer, the request to read or write application data may be processed more quickly from the cache appliance's memory than would otherwise occur if the application data were processed from the disk arrays or cache memory in the NAS filer. In this description, a reference to a cache appliance (e.g., 212) may include one or more cache appliances that are connected or clustered together and working in tandem to form a single homogeneous caching device, as described more fully below. In addition, it will be appreciated that each cache appliance may be constructed as a high-speed packet processor with a substantial cache memory by including a set of network processing resources (such as a network switch and network processor(s)), a dynamic cache memory, a non-volatile cache memory and cache controller(s).

As indicated in FIG. 2, the intelligent cache appliances may be installed in a variety of different locations in the enterprise storage network 200 to provide the caching benefits to a one or more NAS filers (as shown by the placement of the cache appliance 219 in relation to NAS filers 220-222) or to a group of NAS filers (as shown by the placement of the cache appliance 212 in relation to the switched NAS filers 213-215). However positioned, the cache appliance operates to intercept all requests between the storage clients and the filers fronted by the cache appliance and provide read and write cache acceleration by storing and recalling frequently used information. Obviously, for this to occur, the cache appliance must be the only path that is able to reach the filers from the clients, and if any other path is available, cache coherency problems arise when a piece of information stored on the cluster is modified through an alternate path.

When provided with packet inspection capability, each cache appliance 212, 219 is able to inspect the packet information in each of the TCP/IP stack layers to determine the physical port information for the sender and receiver from the L2 data link layer, the logical port information for the sender and receiver from the L3 network layer, the TCP/UDP protocol connection information from the L4 transport layer, and the NSF/CIFS storage protocol information from the L5 session layer, as well as to parse and extract the fields from the upper layers (e.g., L5-L7). In addition, the packet inspection capability enables each cache appliance to be spliced seamlessly into the network so that it is transparent to the L3 and L4 layers and only impacts the storage requests by processing them for the purposes of accelerating them, i.e., as a bump-in-the-wire. Rather than splicing all of the connection parameters in the L2, L3 and L4 layers, each cache appliance splices only the connection state, source sequence number and destination sequence number in the L4 layer. By leaving unchanged the source and destination MAC addresses in the L2 layer, the source and destination IP addresses in the L3 layer and the source and destination port numbers in the L4 layer, a client perceives that it is communicating with the filer, and vice versa, and there is no awareness at either the client or filer of any intervening cache appliance. With this approach, the spliced connections between clients and filers are separated to meet the data needs of the client from the cache, while providing periodic updates to meet the connection timeout protocol requirements of the filer. In selected embodiments, a read or write request is processed at the cache appliance by making only layer 1 and layer 2 configuration changes during installation or deployment, and as a result, no filer or client configuration changes are required in order to take advantage of the cache. With this capability, an installed cache appliance provides a fast and transparent storage caching solution which allows the same connections to be maintained between clients and filers. And if there is a failure at the cache appliance, the cache appliance automatically becomes a wire between the client and filer who are able to communication directly without any reconfiguration.

Figure 3:
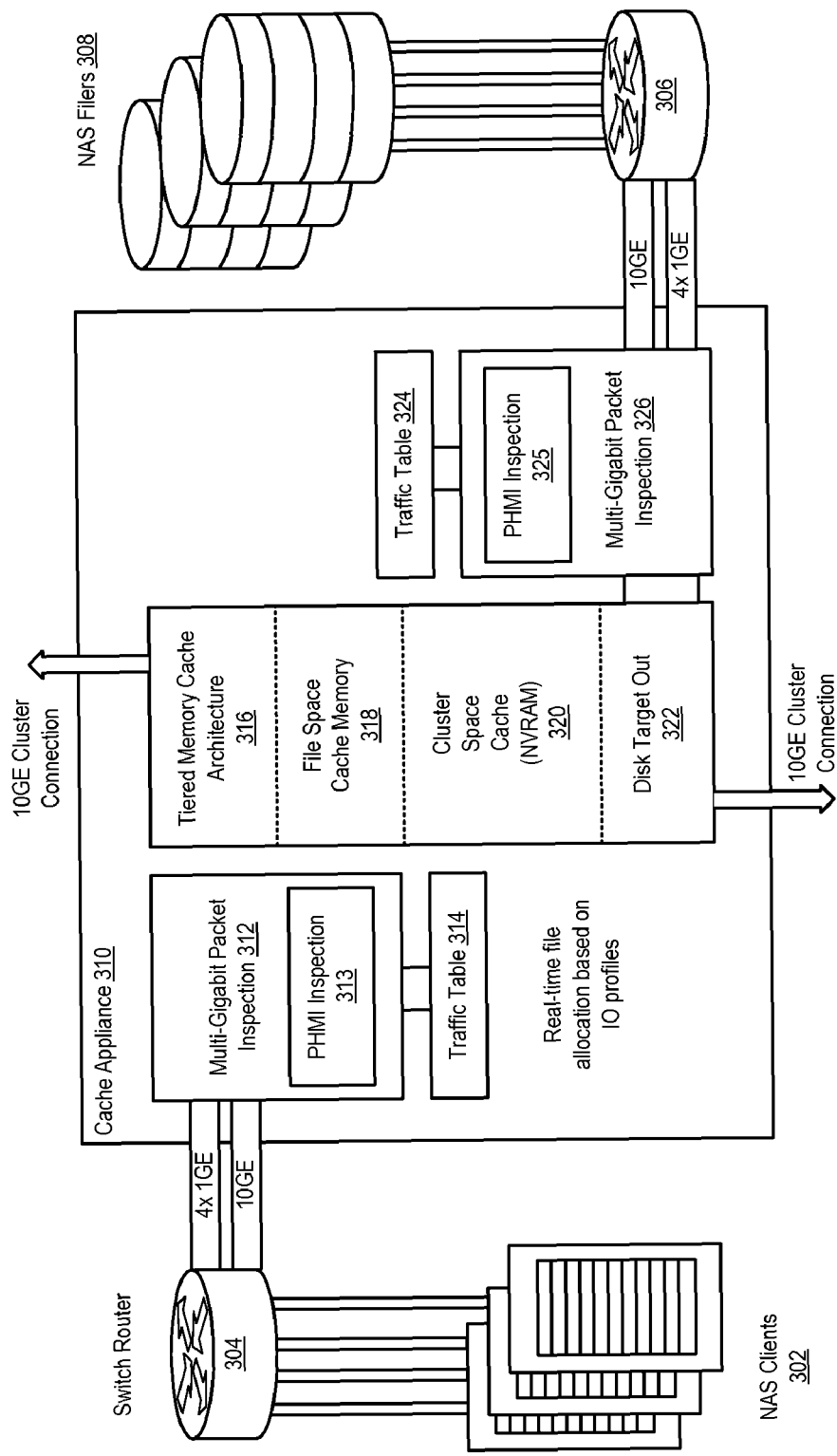
FIG. 3 depicts the functional operation of a non-disruptive storage cache appliance with packet inspection intelligence which uses a perfect hashing match inspection module to inspect incoming packets for predetermined patterns that describe the filer requests in a storage environment.

The functional operation of the packet inspection intelligence which uses a perfect hashing match inspection module to inspect incoming packets for predetermined patterns that describe the filer requests in a storage environment store may be described with reference to FIG. 3 which depicts a storage cache appliance 310 that is connected in-line between one or more NAS clients 302 and a switching router 304 (on the one hand) and one or more NAS filers 308 and a switching router 306. When a request to read or write application data is received from a storage client 302, the cache appliance 310 uses dedicated, high-speed packet inspection hardware 312 to inspect the packets of incoming requests to determine if they should be passed inward for further processing by the cache appliance 310 or forwarded to another destination, such as a NAS filer 308. To this end, the packet inspection hardware 312 includes a perfect hashing memory index (PHMI) inspection module 313 for storing and retrieving information (e.g., connection information, predetermined trigger patterns and/or any other type of information) associated with packets, frames, and/or cells in the communications network. If the NAS client 302 requests application data that is stored on the cache appliance 310, the packet inspection hardware 312 may process the request packet(s) by using the PHMI inspection module 313 to search for predetermined trigger patterns in the request packet(s). If a pattern match is found, the PHMI inspection module 313 generates a data structure pointer and/or index offset to directly address the matching pattern in the upstream traffic table 314 or other datagram memory to perform real-time file allocation based on I/O profiles. By implementing the traffic table 314 as a plurality of indexed datagrams which are each located with a unique n-tuple-based datagram address, each indexed datagram can store a plurality of data payloads for a given data flow, and any pattern in the indexed datagram is directly addressed or retrieved with the index offset which specifies the memory address location for a matching pattern in the indexed datagram as an offset from the n-tuple-based datagram address. If the packet inspection identifies a matching pattern which indicates that the request is to be processed by the cache appliance 310, the request is passed internally to the tiered memory cache system 316 which controls the cache storage into tiers. At this point, a host processor makes a cache decision by retrieving the matched pattern from its local memory which stores a plurality of indexed trigger patterns which are each located with a unique data structure pointer so that any matched pattern in the local memory may be directly addressed or retrieved with the unique data structure pointer. For example, tier 1 storage is reserved for the most critical data (including email, high transaction databases, business critical processes and line of business applications), while tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a dynamic cache memory 318 provides a file space for caching application data, while a non-volatile random access memory (NVRAM) 320 provides a space for caching pending write operations to NAS filers for the purpose of maintaining data coherency in a failure event, such as network packets not arriving to their destination. If it is determined that the request can not be serviced by the cache appliance 310, the output module 322 outputs the client request the disk target in the destination NAS 308.

In similar fashion, when a response to a request to read or write application data is received from an NAS filer 308, the cache appliance 310 uses dedicated, high-speed packet inspection hardware 326 to inspect the packets of incoming responses to determine if they should be passed inward for further processing by the cache appliance 310 or forwarded to another destination. To assist with this determination, the packet inspection hardware 326 may include a PHMI inspection module 325 for storing and retrieving information (e.g., connection information, predetermined trigger patterns and/or any other type of information) associated with packets, frames, and/or cells in the communications network. If the NAS filer 308 returns application data in response to a read request, the packet inspection hardware 326 may process the response for possible caching at the cache appliance 310 by using the PHMI inspection module 325 to search for predetermined trigger patterns in the response packet(s). If a pattern match is found, the PHMI inspection module 325 generates a data structure pointer and/or index offset to directly address the matching pattern in the downstream traffic table 324 or other datagram memory to perform real-time file allocation based on I/O profiles. Again, the index offset may be used in combination with the n-tuple-based datagram address to locate a copy of the matched pattern in the datagram memory, while the data structure pointer may be used to locate a copy of the matched pattern in the host processor's local memory. By implementing the traffic table 324 as a plurality of indexed datagrams which are each located with a unique n-tuple-based datagram address, each indexed datagram can store a plurality of data payloads for a given data flow, and any pattern in the indexed datagram is directly addressed or retrieved with the index offset which specifies the memory address location for a matching pattern in the indexed datagram as an offset from the n-tuple-based datagram address. If the packet inspection indicates that the response is to be processed by the cache appliance 310, the response is passed internally to the tiered memory cache system 316 which controls the cache storage into tiers.

Figure 4:
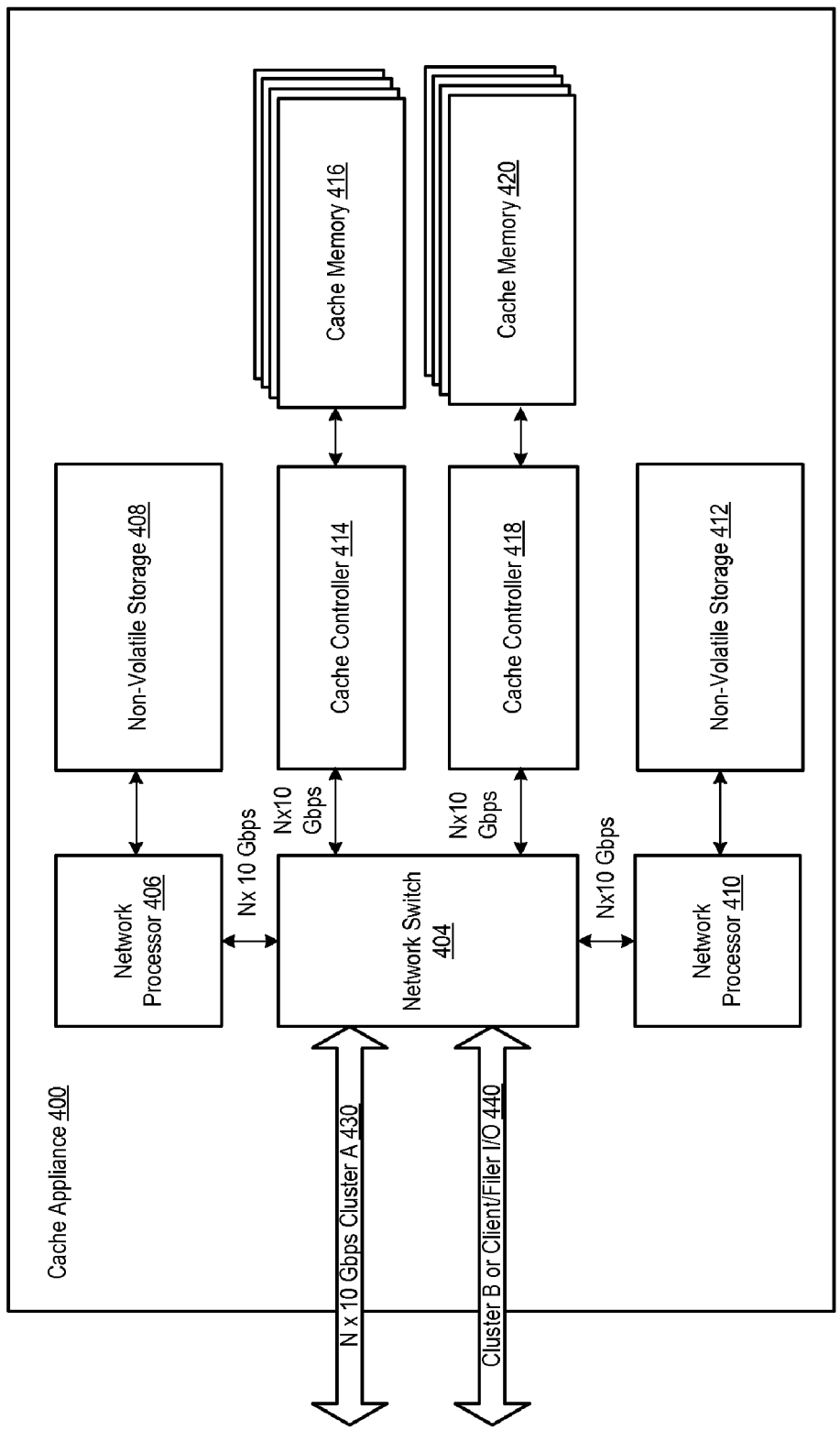
FIG. 4 is a block diagram of a cache appliance which uses cache memory in accordance with selected embodiments of the present invention.

As described herein, the cache appliance is the fundamental element of the data storage cache system, and is implemented as a combination of a high-speed packet processor and a large cache memory. While a variety of different architectures may be used to implement the cache appliance, FIG. 4 depicts in block diagram form an example hardware implementation of a cache appliance 400 which may be used in connection with selected embodiments of the present invention to provide network interfaces, packet processing and cache memory. To provide these functions, the cache appliance 400 includes a network switch interconnect component for routing network traffic, a network processor component for packet processing, and a cache controller and a cache memory component for storing cached data files.

The central element of the cache appliance hardware 400 is a high-speed network switch 404. The network switch 404 provides client and filer interfaces, 10 Gbps cluster interfaces, and multiple 10 Gbps connections to the packet processing and cache controller hardware. The network switch 404 manages data flow between the I/O ports 430, 440 and the packet processing and cache controller hardware, and may be optimized for network traffic where it is desirable to obtain extremely low latency. The network switch 404 may be configured to concurrently accommodate a large number of independent accesses that are processed on each clock cycle, and enables communication data requests from network processor hardware to the cache hardware, as well as data responses from cache hardware to the network processor hardware. In one embodiment, network switch 404 includes logic (such as multiplexers or a switch fabric, for example) that allows any network processor to access any cache memory, and that conversely allows data to be returned from any cache memory to any network processor. Network switch 404 may also include logic to queue data requests and/or responses, such that requests and responses may not block other activity while waiting for service, and may be configured to arbitrate cache access conflicts.

The cache appliance hardware 400 also includes one or more network processor units (NPUs) which run the core software on the device to perform node management, cluster communication, packet processing, cache management, and client/filer communication. In a selected embodiment, two NPUs 406, 410 are provided, where each NPU may be implemented as a multi-threaded multi-core processor. To assist with device operation, each NPU 406, 410 controls a durable or non-volatile cache memory 408, 412, respectively. With the non-volatile cache memory units 408, 412, a very large amount of durable memory (e.g., 128 Gigabyte) may be provided for caching device operation software or data, such as with a field replaceable solid state drive (SSD) or hard disk drive (HDD) memory.

Finally, the cache appliance hardware 400 includes a substantial cache memory 416, 420 (e.g., 64-512 Gigabytes) for dynamically caching data files. To control the cache memory, the cache appliance hardware 400 includes a cache controller for each cache memory. In selected embodiments, two cache controllers 414, 418 are provided, respectively, for each volatile cache memory 416, 420. Each cache controller 414, 418 is responsible for connecting both the dynamic cache memories 416, 420 and the non-volatile storage 408, 412 to the high-speed interconnect within the cache appliance 400. In addition, the cache controllers 414, 418 may offload some cache memory lookup and coherency functions from the network processors 406, 410.

To increase the caching capacity and performance of the data storage cache system, a cache appliance may be connected or clustered with one or more additional cache appliances on a private network so that the appliances work in tandem to form a single homogeneous caching device. As described above, each cache appliance 400 contains a set of network processing resources, dynamic storage, and non-volatile storage that are combined as a pool of resources which may be treated as a node on the network. To this end, each cache appliance 400 includes I/O ports 430, 440 that allow the cache appliance 400 to be connected to another cache appliance.

Figure 5:
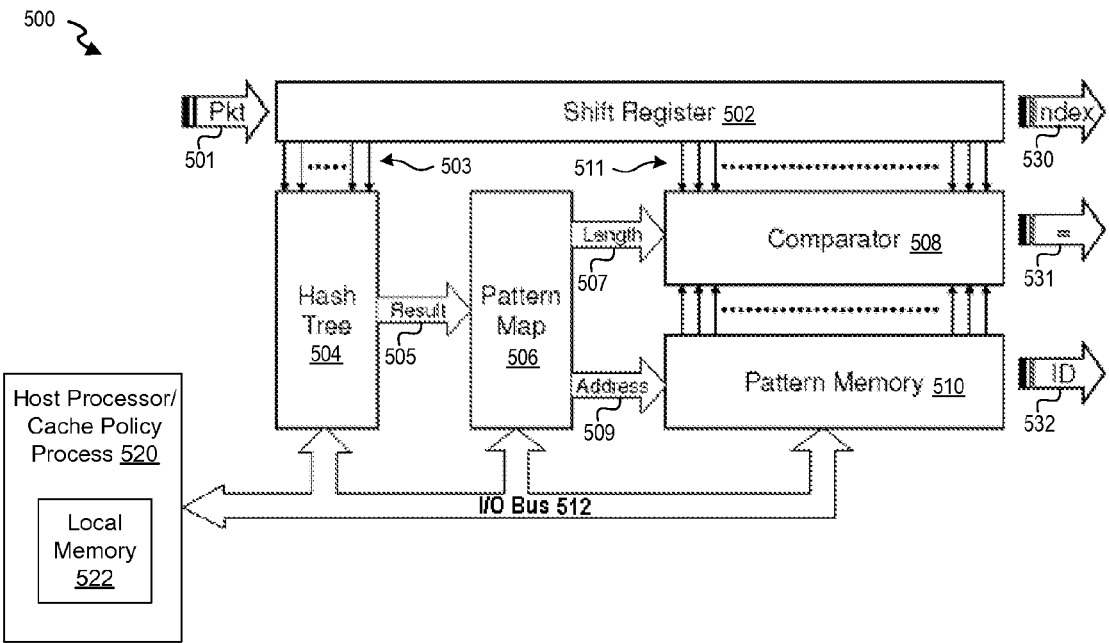
FIG. 5 depicts a simplified block diagram of a perfect hashing memory inspection module for rapidly inspecting incoming packets for matching patterns and specifying memory location address information for any matching patterns in accordance with selected embodiments of the present invention.

To understand an example implementation of the present invention, reference is now made to FIG. 5 which depicts in simplified block form the design and operation of a perfect hashing memory index inspection module 500 for rapidly inspecting incoming packets for matching patterns and specifying a memory location for any matching patterns that is used by the cache policy process/host processor 520 to make cache decisions. The depicted PHMI module 500 may be implemented by the network packet processor or dedicated hardware circuitry in combination with memory or storage devices to provide a serial-in parallel-out shift register 502, a hash tree table 504, a pattern map lookup table 506, a comparator 508, and a pattern memory 510, all of which are connected together and to a cache policy process/host processor 520 over one or more input/output connection busses 512. In operation, each incoming packet data 501 is shifted into the serial-in parallel-out shift register 502. A selected subset of the incoming data bits 501 is provided by a first set of parallel-out lines 503 of the shift register 502 as inputs to the hash module 504. In addition, a second set of parallel-out lines 511 from the shift register 502 provide input to the comparator 508, which is also fed by the pattern memory 510 that stores the "possible match" patterns.

To detect the "possible match" patterns, the hash module 504 includes a perfect hash tree 504 that applies a Merkle-like hashing function to a plurality of trigger patterns. As will be appreciated by those skilled in the art, a perfect hash function is a hash function that generates a different address for each pattern that is hashed. In an example embodiment, a Merkle-like perfect hashing function is implemented by hash tree 504 which hashes substrings from the incoming packet data 501 to distinguish a predetermined set of trigger patterns, thereby guaranteeing that no collisions will occur for a given set of substring entries. To accomplish this, a unique substring is selected for each pattern (e.g., a pre-fix or suffix), and the length of the set of substrings is reduced by deleting all the columns (bit-positions) that are not necessary to distinguish the substrings. For example the patterns "//path1/subpath1/A" and "//path2/subpath2/B" are reduced, respectively, to "11A" and "22B." Subsequently, the remaining bit-positions are input to the Merkle-like hash tree 504. Since a Merkle hash tree is constructed based on the idea of "divide and conquer," the size of the hash tree 504 depends only on the number of the substrings, and not on their length. In addition, the hash tree 504 may be implemented in hardware as a binary hash tree that uses 2-to-1 multiplexers for each node, though other optimized hash tree structures may also be used.

The application of the perfect hash tree 504 to the incoming data bits generates a pattern ID result 505 of the "possible match" pattern. Rather than using the pattern ID result 505 to directly read the "possible match" pattern from the pattern memory 510, the pattern ID result 505 is applied as an index to a pattern map lookup table 506 which outputs, for each "possible match" pattern, the length 507 and the actual address 509 of the "possible match" pattern in the pattern memory 510. In this way, the pattern map 504 provides a 1-to-1 mapping to generate a unique address 509 that is used to read the "possible match" pattern from the pattern memory 510, while the pattern length 507 is used to determine how many bytes of the pattern memory and the incoming data are needed to be compared.

At the pattern memory 510, the address 509 is applied as an index to retrieve, for each address, a corresponding pattern and an associated ID or data structure pointer value 532. The corresponding pattern that is indexed by the address 509 is then provided in parallel to the comparator 508. And when the comparator 508 determines that there is a match, the associated ID or data structure pointer value 532 may be provided to the cache policy process/host processor 520 as an identifier to indicate which matching pattern was found at the location of the last hit. For example, the host processor 520 may include a copy of the trigger patterns in local memory 522 which are indexed or addressed by the data structure pointer value 532. Thus, if there are 1000 patterns that could potentially be used as trigger patterns, but a particular cache policy chooses to use only 100 of the patterns as trigger patterns, the cache policy process/host processor 520 populates the local memory 522, hash tree table 504 and pattern memory 510 with the chosen trigger pattern information and corresponding ID values. Once the hash tree 504, pattern map 506 and pattern memory 510 are populated and a pattern match is detected at the comparator 508, the cache policy process/host processor 520 uses the resulting ID value 532 to retrieve the matched pattern from the local memory 522. In addition or in the alternative, the PHMI inspection module 500 may generate an index value 530 to retrieve the matched pattern from a datagram memory at location m+n in the payload data, where "m" and "n" specify that the hash hit happened on the n-th payload byte of the m-th packet on the c-th flow. In other words, "m" is the total number of bytes of the payload that have been received in one or more packets and analyzed prior to the current packet, while "n" is the number of bytes analyzed so far in the current packet. To provide an illustrative example of how the index value 530 is computed, if the PHMI inspection module has already scanned and analyzed m=9 packets having a total payload of 5,102 bytes, and a tenth packet in the same flow is received that has a pattern at location n=234 of the TCP payload that matches one of the trigger patterns, then the index value 530 would be 5,102+234=5,336. As for computing the ID value 532 that is stored in the pattern memory 510, any unique identifier can be used to indicate which trigger pattern has been detected in the received payload. However, instead of using the ID value 532 from the pattern memory 510 to retrieve the matching pattern from the host processor's local memory, it will be appreciated that the "Hash to Address pattern" mapping ID 505, the address 509 of the location in pattern memory 510, or even the actual matching pattern can also be used to retrieve the matching pattern, but the ID value 532 is a much smaller number (10 bits or smaller) given that the memory address and the pattern sizes are variable depending on the pattern signatures which they could be between 4 and 24 bytes.

In selected embodiments, both the index value 530 and the ID value 532 are used to retrieve separate copies of the matched pattern that may be compared for verification purposes before applying the caching policy. However, in other embodiments when verification is not required or desired, the cache policy process/host processor 520 may use either the index value 530 or the ID value 532 to retrieve a single copy of the matched pattern from the datagram memory or local memory.

For purposes of illustrating how the cache policy process/host processor 520 populates the hash tree 504, pattern map 506 and pattern memory 510, reference is now made to Table 1 below which provides an example set of values for translating a selected set of patterns P1-Pn (where n is the number of patterns) to a corresponding set of ID values:

TABLE 1

| Pattern | Hash | Map | Address | ID |
|---------|------|-----|---------|-----|
| P1 | H1 | 1 | 0x000 | 1 |
| P2 | H2 | 2 | 0x001 | 2 |
| P3 | H3 | 3 | 0x002 | 5 |
| P4 | H4 | 4 | 0x003 | 6 |
| P5 | H5 | 5 | 0x004 | 7 |
| P6 | H6 | 6 | 0x005 | 9 |
| Pn − 2 | Hn − 2 | n − 2 | 0x062 | 113 |
| Pn − 1 | Hn − 1 | n − 1 | 0x063 | 127 |
| Pn | Hn | n | 0x064 | 135 |

As shown in Table 1, once a selected set of patterns P1-Pn is chosen, the host processor 520 calculates the corresponding hash values for $H_1$-$H_n$, and loads them over the I/O bus 512 as output values in the hash tree table 504 and as index/input values in the pattern map 506. In addition, corresponding map values 1-n are computed and loaded into the pattern map 506 as output values, while corresponding address values 0x000-0x064 are loaded into the pattern map 506 and pattern memory 510 as output values and input/index values, respectively. Finally, corresponding ID values (e.g., 1, 2, 4, 6, 7, 9, 113, 127, 135) are assigned and loaded into the pattern memory 510 as output values. As described herein, the information from Table 1 may also be stored in the local memory 522 of the host processor 520. With these values loaded in the PHMI module and in the local memory 522, the cache policy process 520 uses the index value 530 and/or the ID value 532 to retrieve from memory one or more copies of a trigger pattern that matches a pattern in the received packet payload, and then uses the retrieved matching pattern(s) to make caching decisions by applying a policy profile to the request containing the matching pattern to determine whether clients, filers and data will be included or excluded from the cache acceleration function. For example, if a policy profile was created to prevent jpg files from being cached (e.g., "do not cache/data/*.jpg"), then the trigger pattern is "/data/*.jpg," in which case the host processor 520 would determine and store the hash value="1101001101" (based on a Merkle Hash Tree function), the pattern map address="0x10234," and the ID="123." If the tenth packet in a flow having a sequence number=5,102 is received that has a pattern "/data/*.jpg" at location n=234 of the TCP payload in the tenth packet, then the policy process would use the ID="123" to retrieve a first copy of the matched trigger pattern "/data/*.jpg" from the host processor's local memory, and would also use the index value "5,336=5,102+234" to retrieve a second copy of the matched trigger pattern "/data/*.jpg" in the datagram memory. After successfully comparing the two copies, the policy process would conclude that the do-not-cache policy should be applied to this file read or write request.

When the comparator 508 confirms that there is a match between a pattern in an incoming packet data 501 (provided by the shift register 502) and a "possible match" pattern (provided by the pattern memory 508), the comparator 508 generates a "match" signal 531. In addition, a data structure pointer 532 and index offset 530 are generated for use by the host processor in directly addressing the matched pattern in the memory. The particular way in which the data structure pointer 532 and index offset 530 are generated will depend on the type of data structures stored in memory, but in any event, they will be generated to directly address the matching pattern in memory for use in determining if the storage request is handled by the cache appliance, thereby avoiding an extensive memory search for the pattern in a large connection table. In embodiments where each data structure pointer 532 is used to address a table of patterns in local memory, the data structure pointer 532 can be stored as part of the pattern memory 510 (as described above), or can be separately generated from the unique address result 505 or address 509, either directly or as a shifted version thereof, or with any other unique memory address generation scheme which provides data structure memory addresses that are separated from one another sufficiently to allow the data payloads from a flow to be store between adjacent memory addresses. And where the index offset 530 is used to point to the location of a matched pattern stored in a table or datagram in memory for storing the data payload portions of packets belonging to a single flow, the index offset 530 may be generated by a shift count that is maintained in the shift register 502. For example, as the incoming packet data 501 is buffered and shifted in the shift register 502, the shift count may be tracked from the beginning of the payload (e.g., from the beginning of the L5 field for each packet) and used to generate the index offset 602, either alone or in combination with the total length of the data payload(s) from the previous packet(s). In an example implementation, the sequence number (SEQNBR) from the packet having the matching packet may be extracted from the L1-L4 fields to provide a cumulative total length of the data payload(s) from the previous packet(s), and then combined with the shift count to provide the index offset 530.

Figure 6:
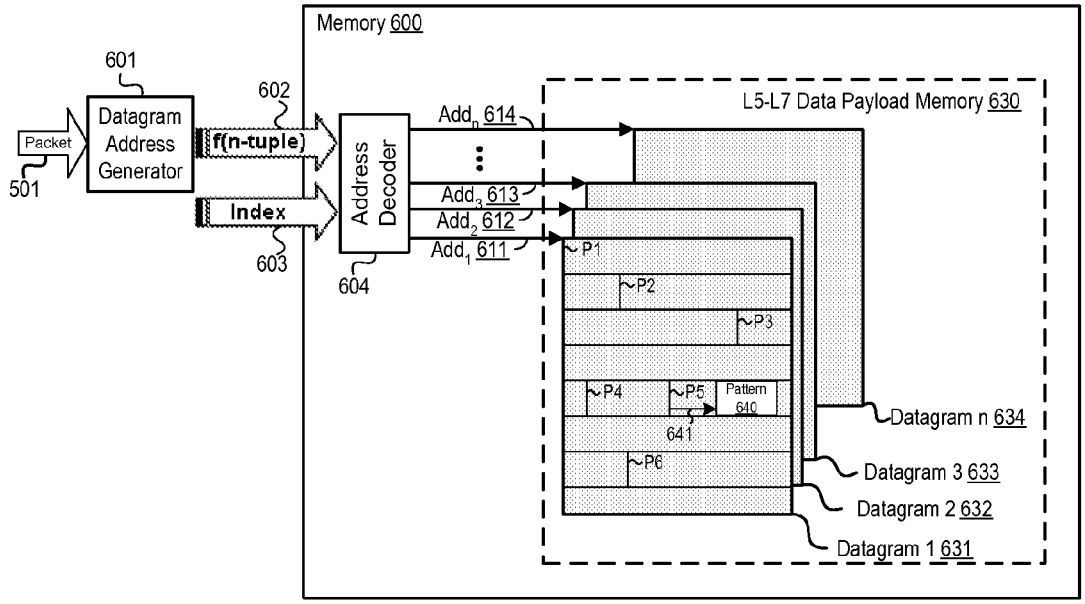
FIG. 6 depicts an example memory allocation for storing and retrieving patterns from a data payload memory using the perfect hashing match inspection scheme in accordance with selected embodiments of the present invention.

To understand how the index offset 532 is used to directly retrieve a matching pattern from memory, reference is now made to FIG. 6, which depicts an example memory allocation for storing and retrieving patterns from a data payload memory 630. As depicted, the index offset 603 generated by the PHMI module is used in combination with an n-tuple-based datagram address 602 to directly address the patterns stored in the data payload memory 630. The data payload memory 630 may be implemented with the cache memory 600 which includes one or more address decoders 604 and stores data payload or datagram structures 631-634. In operation, each received network packet 501 is supplied to a datagram address generator 601 which generates an n-tuple-based datagram address 602. In an example embodiment, the datagram address generator 601 includes an n-tuple generator which assembles at least the source IP address (SIP), destination IP address (DIP), source transport port (SP), and destination transport port (DP), though other packet segment fields may also be used, including but not limited to the virtual LAN (VLAN ID), the type, protocol, and MAC. The n-tuple serves as a connection identifier for the network packet, and may be further processed by the datagram address generator 601 using any desired algorithm to generate the n-tuple-based datagram address 602 as a function of the n-tuple (f(n-tuple)).

In addition to the n-tuple-based datagram address 602, an indexing value 603 is generated by the PHMI module, such as by combining a sequence number (SEQNBR) with the shift count as described above. Together, the n-tuple-based datagram address 602 and indexing value 603 are applied to retrieve or store matching patterns from the data payload memory 630. In particular, the n-tuple-based datagram address 602 is applied to the address decoder 604 to select or address one of the data payload memory structures 631-634, and then the index offset 603 is applied to the address decoder 604 to point directly to the location of the matching pattern in the selected data payload. Thus, when the data payloads (e.g., the data contained in the L5-L7 packet fields) from each received network packet (e.g., Packet 1 through Packet 6) in a particular data flow are stored in a first datagram structure 631, the n-tuple-based datagram address 602 is decoded to generate a first datagram address $Add_1$ 611, and the data payload from the first packet is stored beginning at position P1, the data payload from the second packet is stored beginning at position P2, and so on until the data payload from the sixth packet is stored beginning at position P6. In similar fashion, the data payloads from the received network packets in other data flows (e.g., data flow 2 through data flow n) are separately addressed (with datagram addresses $Add_2$ 612, $Add_3$ 613, ... $Add_n$ 614) and stored in respective datagram structures 632-634.

With this example data structure, the datagram address 602 and index offset 603 generated by the PHMI module are used to directly address the matching pattern 640 from the data payload portion of Packet 5 in data flow 1 that is stored in the first datagram structure 631. In particular, the datagram address 602 addresses or points to the first datagram structure 631, and the index offset 603 addresses or points to the beginning of the matching pattern 640, which is located at an offset 641 from the beginning position P5 of the data payload from the fifth packet. As for populating the initially empty datagram structures for connections cached at the cache appliance, the datagram address values may be chosen to separately point to datagram structures that are effectively guaranteed to be unique from one another. As for storing the data payload portions of the packets in each datagram, data payloads from successive packets are stored by calculating the total length of the any previously-stored data payload(s) from the previous packet(s) to determine where the next available memory space is located in the datagram.

The PHM pattern matching algorithm described herein is an accurate pattern matching solution which allows a predetermined NFS/CIFS trigger pattern set to be centrally stored and periodically updated or optimized as needed. As disclosed, the entire payload of every incoming packet is scanned while maintaining a constant throughput and avoiding false positives and false negative. In addition, the generation of direct address values to specify the starting location of the matching pattern in memory accelerates evaluation of the pattern by the host processor. Finally, the hash tree and memories may be pipelined to increase system performance, improve memory utilization, and exploit memory replication.

Figure 7:
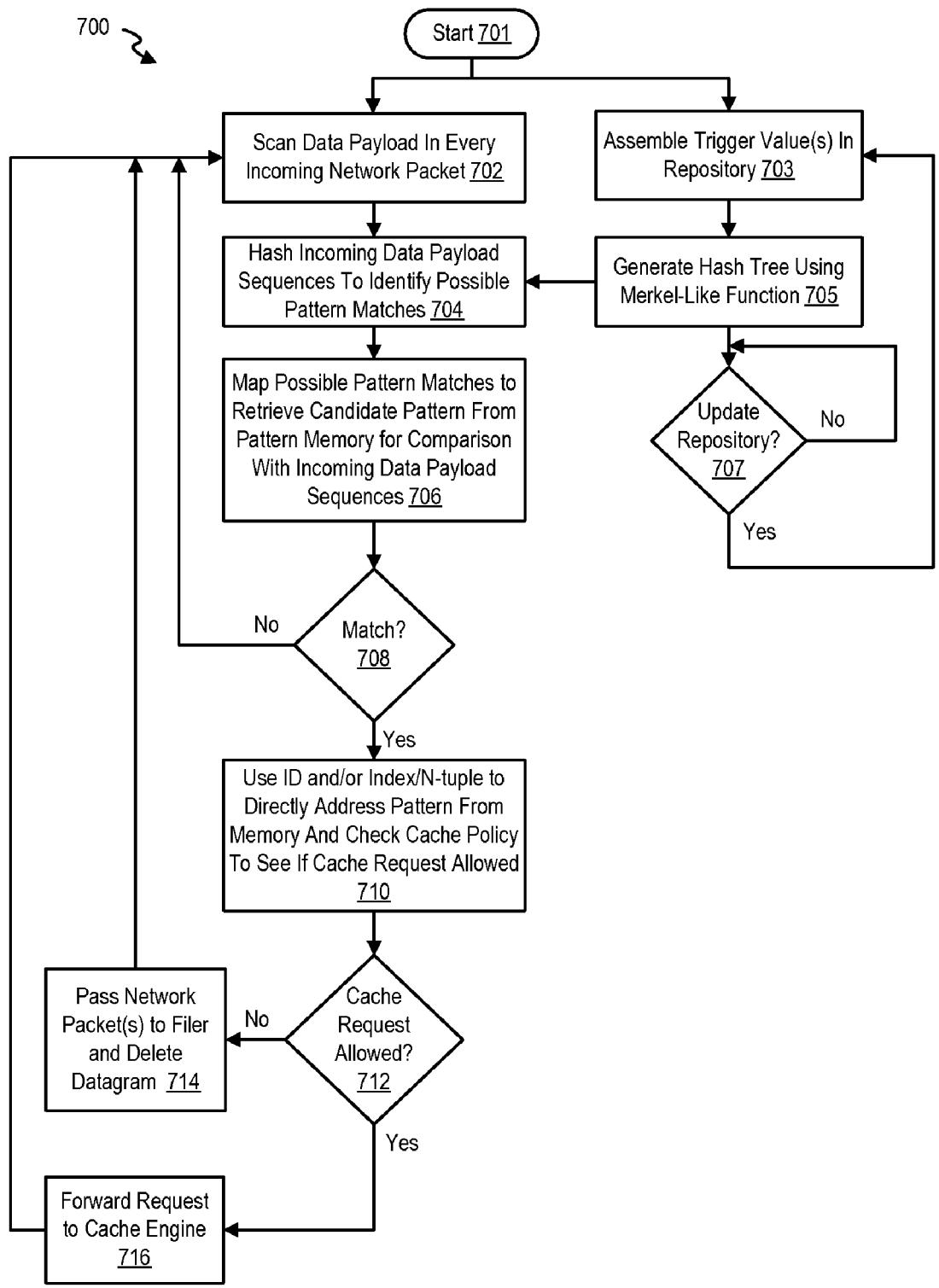
FIG. 7 depicts an example process flow sequence for identifying one or more predetermined patterns in received network packets and directly addressing the matching pattern in datagram memory to determine if a cache request is allowed for the pattern in accordance with selected embodiments of the present invention.

Turning now to FIG. 7, selected embodiments of the present invention may be more generally understood with reference to the depicted example flow methodology 700 for identifying one or more predetermined patterns in received network packets and directly addressing the matching pattern in datagram memory and/or local memory to determine if a cache request is allowed for the pattern in accordance with selected embodiments of the present invention. The process starts (step 701) when one or more network packets are received. Each packet is inspected to extract connection identification information that uniquely identifies a connection between a client and filer, and to scan the data payload portion of each packet (step 702).

Hash values are then calculated from the scanned data by using a perfect hashing memory scheme to identify possible pattern matches (step 704). For example, a perfect hash tree module may be applied to selected bit positions of the shifted incoming data to determine which bit patterns are a possible match with a set of trigger patterns embodied in the perfect hash tree module. At this stage, it will be appreciated that the perfect hash tree module has previously been populated by assembling the set of trigger pattern values into a repository (step 703). Examples of trigger pattern values include, but are not limited to pathnames (e.g., "//path1/subpath1/A," "//path2/subpath2/B," etc.), filenames (e.g., "texture.ts3"), filename prefixes or suffixes (e.g., ".docs," ".jpg," ".exe," "hex," ".txt," ".tex," ".ts2," ".ts3" etc.) or even specific file content, such as an internal file statement that signifies a type of file (e.g., "[begin] [format=mp4]").

Once the set of trigger pattern values are assembled, they are processed to generate the perfect hash tree using a Merkle-like function (step 705). Such perfect hashing tree generation techniques are understood by those skilled in the art, such as those described in I. Sourdis et al., "Scalable Multi-Gigabit Pattern Matching for Packet Inspection," IEEE Trans. On VLSI Systems, Vol. 15, Issue 2, pp. 159-166 (February 2008), which is incorporated by reference in its entirety as set forth fully herein. In addition, the use of the perfect hashing match index scheme allows a configurable hash tree to be generated which embodies an NFS/CIFS pattern set that can be updated as needed (step 707) so that the patterns which trigger the caching operations can be programmed and adjusted to optimize cache performance.

By sequentially shifting and hashing the received packets (including the payload data), the hash tree sequentially outputs IDs for "possible match" patterns which may be mapped to retrieve candidate patterns from the pattern memory for comparison with the incoming data payload sequences (step 706). If the comparison indicates that there is no match (negative outcome to decision 708), the process returns to process to continue scanning the (next) packet(s) (step 702). However, if there is a match (affirmative outcome to decision 708), the ID and index values corresponding to the matched pattern are retrieved (e.g., from the pattern memory and shift register, respectively) and used to directly retrieve or otherwise address the matching pattern in memory (step 710). In particular, the ID value is used to retrieve the matching pattern from a table in local memory which correlates the ID with its corresponding trigger pattern. In addition or in the alternative, the index value is used in combination with a datagram address to retrieve the matching pattern from the datagram memory. With either or both copies of the matching pattern, the host processor can invoke the cache policy to determine if the request embodied in the packet(s) can be locally cached (step 710). If the host processor determines that the cache request is not allowed (negative outcome to decision 712), the network packets are passed to the filer for handling and the datagram which temporarily stores the data payload is deleted (step 714) before the process returns to process the next packet(s) (step 702). On the other hand, if the host processor determines that the cache request is allowed (affirmative outcome to decision 712), the request is forwarded to the cache engine for handling (step 716), after which point the process returns to process the next packet(s) (step 702).

Figure 8:
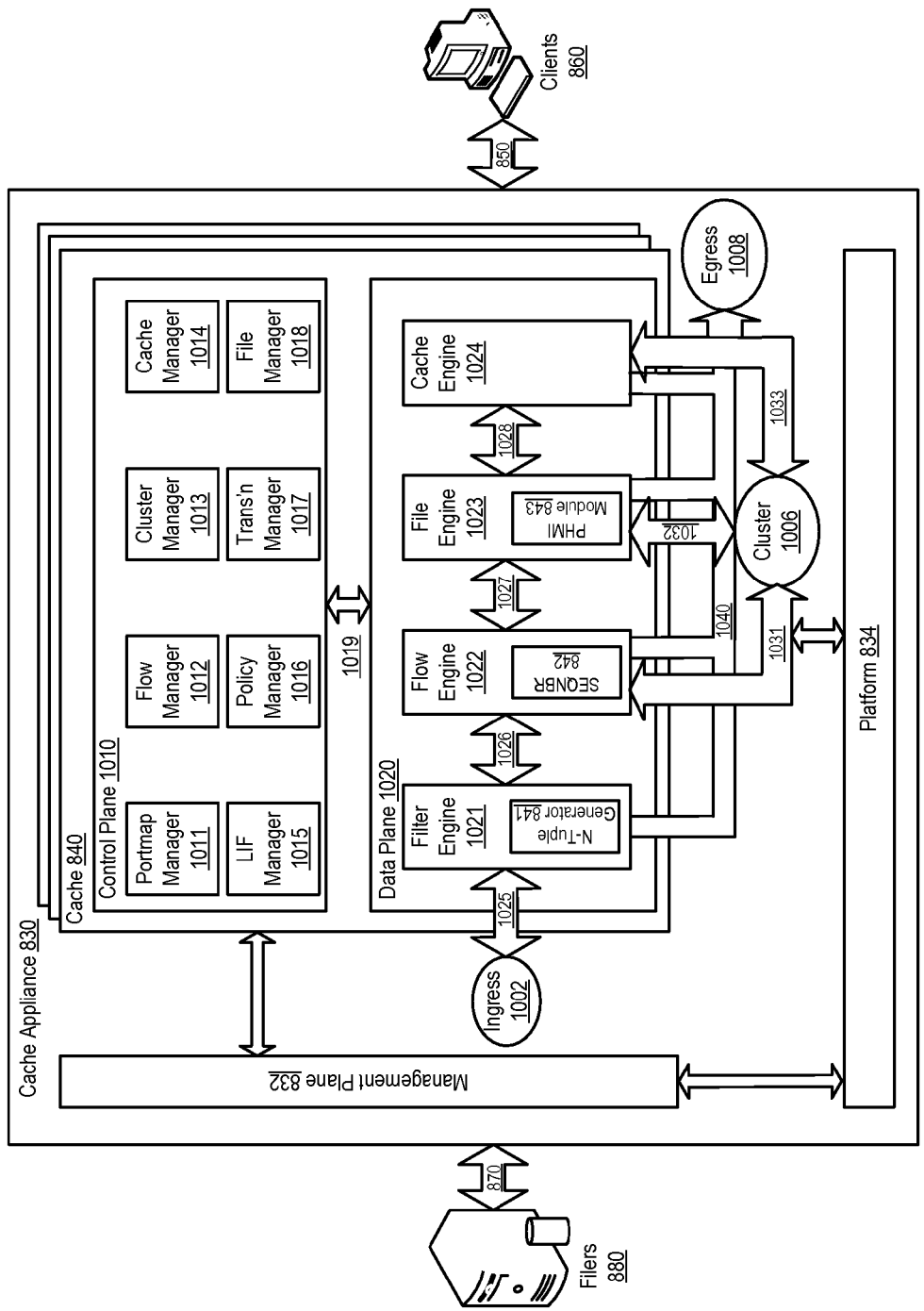
FIG. 8 depicts the overall system architecture of a non-disruptive storage cache appliance to show how the control plane and data plane interact to process an incoming data request.

To illustrate the constituent component functionality of the cache appliance, reference is made to FIG. 8 which depicts the overall system architecture of a non-disruptive storage cache appliance 830 which is configured to receive and process packets from the clients 860 and filers 880 that are sent over the connection interfaces 850, 870. The depicted architecture of the cache appliance 830 is divided into three logical components, including the platform component 834, the cache component(s) 840, and the systems management component 832.

The platform component 834 includes the hardware and system software components that come together to form the basis of the system. As described hereinabove, the hardware in the platform component 834 includes the individual cache appliance (described above with reference to FIG. 4) which provides network interfaces, packet processing and cache memory. In selected embodiments, more than one cache component 840 may be connected together in a cluster using the cluster interface 1006. The software in the platform component 834 includes a boot loader component (for bringing the appliance to a minimal operating state), an operating system component (to provide for process scheduling, memory allocation, network, and flash file system facilities) and drivers (for extending the OS functionality and provide access to required hardware).

The cache component 840 includes the embedded software that runs on the cache appliance to implement the caching functionality on the appliance 830. By having the cache appliance 830 servicing I/O requests from the cache 840, responses to clients 860 are accelerated. When the cache component 840 is architected as a shared-nothing system, every piece of file data within the cache memory is found in one and only one memory location and the data is in no way replicated in the system. The cache 840 scans the entire payload of every incoming packet to detect predetermined trigger patterns in the incoming packets, and then quickly locates any matching patterns using the perfect hashing memory index scheme described herein which guarantees that the location of the matching patterns is unique and deterministic, and which computes the location of the matching pattern in memory at a fixed processing cost (e.g., one or two search cycles). As illustrated, the cache component software 840 includes a data plane section 1020 which performs the required packet processing functions on a packet so that each packet can progress through the cache appliance 830. In other words, if something must be performed to progress a packet through the system, then it is a data plane activity. The data plane 1020 processes received client and filer traffic through a pipeline of operations. At any point during the processing, the data plane 1020 may forward a packet out from the cache component 840 because it is finished servicing the operation, or the packet is not pertinent to the system, or for other reasons.

The cache component software 840 also includes a control plane section 1010 which performs the required processing functions about a packet to facilitate the data plane or that is not required in order to process a packet. In other words, the control plane section 1010 stores control information that affects the data plane 1020. If any stimulus outside of a packet traversing the system requires an operation, then it is a control plane activity. The control plane 1010 is composed of stand-alone data structures as well as a set of managers that themselves may contain their own data structures. The interaction between the control plane 1010 and the data plane 1020 is via the interface 1019 which can be take several forms, such as function calls, IPC requests, or direct access into a data structure's memory. As packets progress through the system, the data plane 1020 queries the control plane 1010 to help it perform its operations. The data plane 1020 conversely sends information to the control plane 1010 that it may either need in subsequent operations or that provide information to the management functions of the system. In addition, the cache component software 840 includes a management plane section 832 which performs various ancillary functions on the system that do not affect the processing of packets or that is on demand from a remote management server.

In operation, the data plane 1020 includes a packet filter engine 1021 that inspects received packets to identify the packets that need to be processed by the cache appliance 830, and forwards all other packets to an exit interface 850, 870. This action minimizes the impact of non-relevant packets on system resources. There are two types of packets that must be identified for further processing: cache appliance IPC packets and client/filer packets. Cache appliance IPC packets are identified based on L2 headers and knowledge of how such packets are formatted (e.g., custom Ethernet types). Client/filer packets are identified based on L2-L4 headers and queries to the port map manager which contains information about the UDP/TCP ports being used by the filers to provide storage services (NFS, CIFS, etc.). The information gleaned from L2-L4 parsing is saved in the packet context to avoid having to parse these headers again in other components.

The data plane 1020 also includes a flow engine 1022 to process TCP connections and UDP conversations by providing a place to store flow context and to implement split TCP connections and flow serialization, where a flow refers to a sequence of TCP or UDP packets having with the same 5-tuple. The flow engine provides a mechanism for other modules to store flow-specific data for later retrieval. For example, the NFS module may store data related to an NFS request to match with an ensuing NFS reply. Another primary example is the TCP connection state information for tracking and updating sequence numbers, retransmits, etc. As from implementing split TCP connections, this occurs when the cache appliance 830 becomes a man-in-the-middle on a connection when a request (e.g., an NFS read) is intercepted and served from local cache. The flow manager implements the logic needed to be a man-in-the-middle on a split connection.

A file engine 1023 in the data plane 1020 handles layer 5-7 NFS, mount, CIFS, HTTP, FTP, and port mapper transactions that are used to perform protocol decode, file lookup, and transaction processing operations. In protocol decode operations, the protocol messages are delineated and decoded based on a protocol content type that is determined by the flow engine. After decode, a file lookup operation is performed using a reverse lookup of the internal file record based on filer and a protocol-specific file reference. To facilitate retrieval of the internal file record, a PHMI module 843 is provided which scans the packet payloads (e.g., the L5-L7 fields from the packet(s)) for patterns that match a predetermined set of trigger patterns, and generates a direct address to the location of any matching patterns stored in memory. This provides the file-specific information needed to quickly process the message (e.g., internal file handle, cache policy, etc). In transaction processing operations, the requests are tracked and correlated with corresponding responses as part of a transaction pair between a client request and filer response, and based on the transaction type, the completed transaction pairs are routed to the appropriate component for further processing. For example, client requests for cacheable objects are intercepted and passed to the appropriate component (data requests to the cache engine), and all the information necessary to complete the transaction is passed on (packet, packet context, file record, request, etc.).

Finally, the data plane 1020 includes a cache engine 1024 that provides fault-tolerant block-level file caching. File requests are translated into cache block accesses. A cache block is a unit of memory that is dedicated to storing file data. The blocks reside within the cache appliance memory. Even though NAS protocols are file-based, cache management may be simplified by superimposing a block approach.

As packet data flows through the cache appliance, the control plane 1110 and data plane 1120 interact to process read and write requests in the packets. As explained more fully below, the data plane 1120 takes in client and filer traffic via the ingress interface 1002 and processes it through a pipeline of one or more operations performed by the engines 1021-1024 in the data plane 1020 which interact with the managers 1011-1018 in the control plane 1010. At any point during the processing, the data plane 1020 may forward a packet out through the egress interface 1008 because it is finished servicing the operation, or the packet is not pertinent to the system, or for other reasons. The data plane 1020 may also forward a packet over the interfaces 1031-1033 to the cluster interface 1006 to forward the packet to another node in the cluster.

When a client/filer packet is first received by the cache appliance 830 at the ingress 1002, the packet is forwarded to the filter engine 1021 over the interface 1025. The filter engine 1021 parses and extracts the L2-L4 fields in the packet to compute a packet context. As illustrated, an n-tuple generator 841 may be implemented in the filter engine 1021 to the extent that the predetermined fields from the packet header used to form the n-tuple are located in the extracted L2-L4 fields. The filter engine 1021 also verifies the packet by computing the IP checksum so that any invalid packet can be dropped. If the received packet is not a TCP/IP or UDP/IP packet, the filter engine 1021 forwards the packet over the interface 1040 to the egress 1008. However, if a TCP/IP or UDP/IP packet is received, the filter engine 1021 obtains the source interface for the packet from the local interface (LIF) manager 1015 which uses a set of physical interfaces belonging to a logical interface to perform link aggregation, port bonding and fail-over, thereby insulating other parts of the system from these L2 details. The LIF manager 1015 provides APIs for the management plane 832 to create and configure logical interfaces, and also provides APIs for the data plane 1020 to determine which logical interface a particular packet arrived on. The filter engine 1021 then uses the source interface to pass the packet and context over the interface 1026 to the flow engine 1022.

At the flow engine 1022, any IP fragment packets are queued until the last fragment is received. In addition, the flow engine 1022 verifies the packet by computing the TCP or UDP checksums so that any invalid packet can be dropped. The flow engine 1022 also looks up the TCP/UDP port in the port map manager 1011 which contains information about the UDP/TCP ports being used by the filers to provide storage services, such as by maintaining a table that maps IP addresses and a UDP/TCP port numbers to a service such as NFS, MOUNT and HTTP. If the received packet is not a TCP/UDP port is not for storage service, the flow engine 1022 forwards the packet over the interface 1040 to the egress 1008. However, if the TCP/UDP port is for storage service, the flow engine 1022 uses the packet 5-tuple to look up the flow record from the flow manager 1012 which stores a flow table indexed by 5-tuples that allows clients to store and retrieve flow-specific data. The flow manager 1012 may also provide a flow balancing service (to spread flows across the cluster's processing elements) and flow serialization (to ensure that each flow is handled by a single processing element). If the flow for the received packet belongs to another node in the cluster, then the flow engine 1022 forwards the packet and context to the flow engine on that node via the interface 1031 and cluster interface 1006. The flow engine 1022 also includes a sequence number module 842 that re-sequences any out-of-order packets, updates sequence numbers and stores the updated sequence number in the context before passing the packet and context over the interface 1027 to the file engine 1023.

At the file engine 1023, upstream packets (e.g., from client to filer) are parsed to extract the L5-L7 fields from the packet and store them in the context or connection state table. If the file engine 1023 determines that an incomplete L7 packet is received, the packet is sent to a reassembly queue. If the received packet is a storage control plane (mount, portmap, etc.), the file engine 1023 forwards the packet and context to the file manager 1018 which maintains file meta-data—such as a name space tree (similar to a dentry tree), individual file records (analogous to inodes), and reverse lookup tables—and correlates file references to ensure cache coherency. Any response packets detected at the file engine 1023 may be dropped, and any read or write requests are stored in the transaction manager 1017 where they are correlated with filer responses for purposes of populating the cache when a read miss occurs (by generating a filer request/reply), cleaning a dirty cache block when a outstanding write acknowledgment comes back from the filer, and updating internal file records when file management requests are answered by the filer. By calculating an internal file handle (IFH), the file engine 1023 can retrieve a file record from the file manager 1018. For example, file records can be retrieved by using a PHMI module 843 in the file engine 1023 to rapidly scan the packet payloads for patterns that match a predetermined set of trigger patterns, and to generate a direct address to the location in memory of any detected matching patterns. Once a matching pattern is detected, the file engine 1023 also checks to see if the read or write request is allowed by querying the policy manager 1016 which provides a unified interface for querying cache policies and resolving conflicts between multiple policies. If the packet contains a file management request, the file engine 1023 constructs an answer from any available file record information and forwards the answer over the interface 1040 to the egress 1008. File management requests that cannot be answered from the file record are forwarded over the interface 1040 to the egress 1008. Finally, if the packet contains a read or write request, the file engine 1023 forwards the request to the cache engine 1024.

Downstream packets (e.g., from filer to the client) are processed differently by the file engine 1023, though some of the processing is the same. First, the downstream packets are parsed to extract the L5-L7 fields which are stored in the context. Incomplete L7 packets are sent to a reassembly queue. If the received packet is a storage control plane (mount, portmap, etc.), the file engine 1023 forwards the packet and context to the file manager 1018. Any request packets from the filer detected at the file engine 1023 may be dropped, and the transaction manager 1017 may be used to look up a corresponding request. If a corresponding request is found, the file engine 1023 updates the packet context after locating the address in the connection state table where the context is stored, but otherwise drops the packet. If a downstream packet contains a pattern that matches one of the predetermined trigger patterns embodied in the hash tree, a file record associated with the packet can be retrieved by using the PHMI module 843 to rapidly scan the packet payloads for the matching pattern and generate a direct address to the location in memory of the detected matching pattern. If the packet contains a file management reply from the filer, the file engine 1023 updates the file record in the file manager 1018. However, if the packet contains a read/write reply from the filer, the packet is forwarded to the cache engine 1024. Any other packets are forwarded over the interface 1040 to the egress 1008.

A packet that makes it to the cache engine 1024 is a read/write request from a client or a read/write response from a filer. For any read request received from a client, the cache engine 1024 receives the packet and context over the interface 1028. Using the internal file handle, offset and length contained in context, the cache engine 1024 determines the list of data blocks for the read request. The cache engine 1024 then queries the cache manager 1014 to determine if the requested data is located within the cluster's cache. Each instance of the cache manager 1014 is responsible for receiving and processing cache requests (converted from NAS file requests) for locally cached data. The cache manager 1014 organizes the RAM—assigned to the data cache—into a collection of data blocks of equal size that are used to store and manage file data. In addition to storing data in cache blocks, the cache manager 1014 may also recycle cache blocks using the LRU-2 algorithm whenever its data cache is over-committed (i.e., the cache is 100% full when a cache-miss occurs). Upon receiving a read request, the cache manager 1014 checks to see if the requested data is present within the cache. If so, this is considered a read cache-hit, and the cache engine 1024 then fetches the data blocks from the cache memory platform. Otherwise, this is a read cache-miss, and the cache manager 1014 sends a read request back to the cache engine 1024 so that it can be forwarded to the filer. The returned data is cached in one or more cache blocks, and the read request is then satisfied from the cache. Finally, the cache block is promoted based on the LRU-2 algorithm. In forwarding a request to the filer, the cache manager 1014 may modify it so that the returned data (from the filer) fills an entire cache block. Finally, the cache engine 1024 formulates one or more response packets to the read request, and sends the requested read data in a response to the client. However, if a client's request is for data that is not in the cache appliance 840 (a read miss), the cache engine 1024 sends a request to the filer for any missing data blocks, and then awaits a response from the filer. As indicated above, this response from the filer is received from the file engine 1023, and includes a context from which the cache engine 1024 determines the list of data blocks. This information is used by the cache engine 1024 to store the missing data blocks in the cache, and to formulate one or more response packets that are send to the client.

For a write request from a client to write data to the cache appliance 840, the cache engine 1024 receives the packet and context from the file engine 1023 over the interface 1028. Using the internal file handle, offset and length contained in context, the cache engine 1024 determines the list of data blocks for the write request, and then stores the data blocks to the cache memory platform, at which point they are marked as "dirty." The cache engine 1024 then commits a write request to the cache manager 1014 which includes a journal which is a fault-tolerant transaction log of the application's write operations that is used exclusively for failure recovery. The cache manager 1014 uses the journal to record write requests in a persistent-store. The store behaves as a transaction log where write requests are began, canceled, and completed. The transactions are stored in a fault-tolerant way such that it requires the failure of three nodes before the data is lost. Upon receiving a write request, the cache manager 1014 checks to see if the requested data is present within the cache. If so, then the cache manager 1014 updates the local cache block with the new data. The cache block is also promoted. Next, the data is submitted to the journal so that it can be written to the cluster. Finally, the request is acknowledged as having been completed. Once the requested write operation is completed, the cache engine 1024 formulates and sends one or more response packets to the client, and then sends write requests for the dirty blocks to filer in order to initiate flushing of dirty cache blocks.

When a filer responds to a write request with a write reply, the cache engine 1024 receives the packet and context from the file engine 1023 over the interface 1028. Using the internal file handle, offset and length contained in context, the cache engine 1024 determines the list of data blocks for the write reply, marks the cached data blocks as "clean" and commits a write request to the journal in the cache manager 1014.

To coordinate and manage the individual cache appliance nodes within the cache 840, the control plane includes a cluster manager 1013 which is responsible for managing node membership and fail-over processing in the cluster 1006. Node membership management involves detecting and handling the movement of nodes in and out of the cluster 1006, and also responds to individual node failures. The cluster manager 1013 notifies registered clients of cluster membership events (e.g., by providing a notification whenever the cluster has been reconfigured). In addition, the cluster manager 1013 provides query services to specify the identity of the cluster, the cluster count, and the ID of each member of the cluster. The cluster manager 1013 may also be responsible for mapping of the data within the cache cluster to specify on which node a particular cache block resides. In other words, it provides a location service for the data.

By now it should be appreciated that there is provided herein a method and system for caching data operations in a standalone cache unit that are requested from one or more networked data storage devices by one or more remote clients. As disclosed, the standalone cache unit includes a cache memory for caching data that is requested by a remote client, a payload memory for storing payload data for one or more packet flows, a packet processor, and a host processor. The packet processor is coupled to the cache memory, the payload memory, and to one or more I/O ports for transparently splicing connections between the data storage devices and remote clients. In addition, the packet processor includes a pattern detection module that is configured to find a matching pattern by scanning a received packet for one or more predetermined trigger patterns and generating a direct memory address (e.g., a data structure pointer or an index offset) for the matching pattern in memory, such as the local memory or payload memory. In selected embodiments, a perfect hashing memory inspection (PHMI) module scans the entirety of the data payload from every received packet using a shift circuit (e.g., a serial-in parallel-out shift register) to receive a plurality of packets and to output in parallel a selected subset of data bits from the received packets. A hash circuit (e.g., a Merkle type hash tree table) in the PHMI module hashes the selected subset of data bits to generate a pattern ID of a possible match from the selected subset of data bits, and a mapping circuit in the PHMI module maps the pattern ID to a length value and an address value for retrieving a trigger pattern to be compared to the selected subset of data bits from the received packets. The mapping circuit may be implemented with a lookup table which is indexed by a pattern ID value to output a length value and an address value corresponding to the pattern ID value. The PHMI module also includes a memory circuit for storing a plurality of trigger patterns, where each trigger pattern is addressed by an address value generated by the mapping circuit. The memory circuit may be implemented with a pattern memory lookup table that is indexed by an address value to output a trigger pattern and a corresponding data structure pointer as a direct memory address. The PHMI module also includes a comparison circuit for comparing a trigger pattern retrieved from the memory circuit with the selected subset of data bits from the received packets and generating a match signal if the selected subset of data bits matches the trigger pattern retrieved from the memory circuit. In addition, the PHMI module includes an output circuit for outputting the direct memory address (e.g., a data structure pointer and/or index offset) when there is a match between the selected subset of data bits and the trigger pattern retrieved from the memory circuit. To generate an index offset, a generator circuit is provided which combines a sequence number from a first packet (having a first data payload in which a matching pattern is detected) with an offset value from the beginning of a first data payload to the first character of the matched pattern. To generate a data structure pointer, a generator circuit is provided for generating or retrieving address information that corresponds to the matching trigger pattern, such as the pattern ID, the address value or the matching trigger pattern itself. Finally, the host processor is coupled to the packet processor and the payload memory. The host processor uses the data structure pointer to retrieve a copy of the matching pattern from the host processor's local memory and apply a cache policy profile to the matching pattern to make a caching decision for a data cache request associated with the matching pattern. The host processor may also use the index offset in combination with a datagram address (which points to a starting address for a datagram structure in the payload memory which stores payload data for a specified packet flow) to point to an offset within the addressed datagram structure/payload memory where the matching pattern is located.

In another form, there is provided a pattern search methodology, apparatus, and system for retrieving a matching trigger pattern from memory that matches a pattern contained in a data packet. In the disclosed method and system, a plurality of trigger patterns are stored in a first memory, where each trigger pattern is addressed by an address that is generated at least in part by hashing one or more data segments from a received data packet. Thereafter, a data packet is received that contains a pattern having one or more data segments. The data segment(s) are hashed (e.g., with a perfect hashing memory scheme) to detect one of the plurality of trigger patterns in the received plurality of data segments by generating a pattern identifier which is used to retrieve one of a plurality of trigger patterns from a first memory. The retrieved trigger pattern from the first memory may be compared with the data segments from the received data packet to determine if the retrieved trigger pattern is a matching trigger pattern that matches at least part of the plurality of data segments. If there is a match, a direct memory address is generated for use by a host processor in locating a copy of the matching trigger pattern in a second memory. In selected embodiments, the direct memory address is generated as a data structure pointer for retrieving a copy of the matching trigger pattern in a local memory of the host processor. In other embodiments, the direct memory address is generated as a datagram address and an index offset, where the datagram address points to a starting address for an addressed datagram structure in a data payload memory which stores payload data for a specified packet flow, and where the index offset points to an offset within the addressed datagram structure where a copy of the matching trigger pattern is located. In yet other embodiments, first and second direct memory addresses are generated for retrieving first and second copies of the matching trigger pattern from the second memory and a third memory, respectively, which are compared to one another to determine if there is a match so that a cache policy profile can be applied to make a caching decision for a data cache request associated with the matching trigger pattern.

In yet another form, there is provided a method, apparatus, and system for accelerating data storage cache access. As disclosed, after storing a plurality of trigger patterns are stored in a first reconfigurable memory, a reconfigurable perfect hash matching scheme is applied to a received data packet to identify a matching trigger pattern from the plurality of trigger patterns, where the matching trigger pattern matches a data pattern contained in the received data packet. If there is a match, a direct memory address is generated for use by a host processor in locating a copy of the matching trigger pattern in a second memory, and a cache policy profile is applied by a host processor to the copy of the matching trigger pattern from the second memory to make a caching decision for a data cache request associated with the matching trigger pattern.

As will be appreciated by one skilled in the art, the present invention may be embodied in whole or in part as a method, system, or computer program product. For example, a computer-usable medium embodying computer program code may be used, where the computer program code comprises computer executable instructions configured to provide non-disruptive, adaptive storage caching using clustered cache appliances with packet inspection intelligence. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A standalone cache unit for caching data operations requested from one or more networked data storage devices by one or more remote clients, the standalone cache unit comprising:
 a cache memory for caching data that is requested by a remote client;
 a payload memory for storing payload data for one or more packet flows;
 a packet processor coupled to the cache memory, the payload memory, and to one or more I/O ports for transparently splicing connections between the data storage devices and remote clients, where the packet processor comprises a pattern detection module configured to find a matching pattern by scanning a received packet for one or more predetermined trigger patterns and generating a direct memory address for the matching pattern in memory; and
 a host processor coupled to the packet processor and the payload memory, where the host processor uses the direct memory address to directly retrieve the matching pattern from memory and applies a cache policy profile to the matching pattern to make a caching decision for a data cache request associated with the matching pattern.

2. The standalone cache unit of claim 1, where the direct memory address comprises a data structure pointer which addresses the matching pattern in a local memory of the host processor.

3. The standalone cache unit of claim 1, where the direct memory address comprises a datagram address and an index offset, where the datagram address points to a starting address for an addressed datagram structure which stores payload data for a specified packet flow, and where the index offset points to an offset within the addressed datagram structure where the matching pattern is located.

4. The standalone cache unit of claim 1, where the pattern detection module comprises a perfect hashing memory inspection module for scanning the entirety of the data payload from every received packet.

5. The standalone cache unit of claim 4, where the perfect hashing memory inspection module comprises:
 a shift circuit for receiving a plurality of packets and outputting in parallel a selected subset of data bits from the received packets;
 a hash circuit for hashing the selected subset of data bits to generate a pattern ID of a possible match from the selected subset of data bits;
 a mapping circuit for mapping the pattern ID to a length value and an address value for retrieving a trigger pattern to be compared to the selected subset of data bits from the received packets;
 a memory circuit for storing a plurality of trigger patterns, where each trigger pattern is addressed by an address value generated by the mapping circuit;
 a circuit for comparing a trigger pattern retrieved from the memory circuit with the selected subset of data bits from the received packets and generating a match signal if the selected subset of data bits matches the trigger pattern retrieved from the memory circuit; and
 an output circuit for outputting the direct memory address when there is a match between the selected subset of data bits and the trigger pattern retrieved from the memory circuit.

6. The standalone cache unit of claim 5, where the shift circuit comprises a serial-in parallel-out shift register.

7. The standalone cache unit of claim 5, where the hash circuit comprises a Merkle type hash tree table.

8. The standalone cache unit of claim 5, where the mapping circuit comprise a lookup table which is indexed by a pattern ID value to output a length value and an address value corresponding to the pattern ID value.

9. The standalone cache unit of claim 5, where memory circuit comprises a pattern memory lookup table that is indexed by an address value to output a trigger pattern and a corresponding data structure pointer.

10. The standalone cache unit of claim 5, further comprising an index offset generator circuit for combining a sequence number from a first packet having a first data payload in which a matching pattern is detected with an offset value from the beginning of a first data payload to the first character of the matched pattern.

11. The standalone cache unit of claim 5, further comprising a data structure pointer generator circuit for generating address information that corresponds to the matching trigger pattern and that is used to locate a copy of the matching trigger pattern in a local memory of the host processor.

12. The standalone cache unit of claim 11, where the address information comprises the pattern ID, the address value or the matching trigger pattern.

13. A pattern search method for retrieving a matching trigger pattern from memory that matches a pattern contained in a data packet, comprising:
 receiving a data packet which contains a pattern comprising a plurality of data segments;
 hashing one or more data segments from the received data packet to generate a pattern identifier which is used to retrieve one of a plurality of trigger patterns from a first memory;

comparing a retrieved trigger pattern from the first memory with the plurality of data segments from the received data packet to determine if the retrieved trigger pattern is a matching trigger pattern that matches at least part of the plurality of data segments; and generating a direct memory address for use by a host processor in locating a copy of the matching trigger pattern in a second memory.

14. The pattern search method of claim 13, further comprising storing a plurality of trigger patterns in the first memory, where each trigger pattern is addressed within the first memory by an address that is generated at least in part by hashing one or more data segments from the received data packet.

15. The pattern search method of claim 13, where hashing one or more data segments comprises applying a perfect hashing memory scheme to detect one of the plurality of trigger patterns in the received plurality of data segments.

16. The pattern search method of claim 13, where generating a direct memory address comprises generating a data structure pointer for retrieving a copy of the matching trigger pattern in a local memory of the host processor.

17. The pattern search method of claim 13, where generating a direct memory address comprises generating a datagram address and an index offset, where the datagram address points to a starting address for an addressed datagram structure in a data payload memory which stores payload data for a specified packet flow, and where the index offset points to an offset within the addressed datagram structure where a copy of the matching trigger pattern is located.

18. The pattern search method of claim 13, where generating a direct memory address comprises generating first and second direct memory addresses for retrieving first and second copies of the matching trigger pattern from the second memory and a third memory, respectively.

19. The pattern search method of claim 18, further comprising:

comparing the first and second copies of the matching trigger pattern to one another to determine if there is a match; and applying a cache policy profile to make a caching decision for a data cache request associated with the matching trigger pattern.

20. A method for accelerating data storage cache access, comprising:

storing a plurality of trigger patterns in a first memory;

applying a reconfigurable perfect hash matching scheme to a received data packet to identify a matching trigger pattern from the plurality of trigger patterns, where the matching trigger pattern matches a data pattern contained in the received data packet;

generating a direct memory address for use by a host processor in locating a copy of the matching trigger pattern in a second memory; and applying a cache policy profile to the copy of the matching trigger pattern from the second memory to make a caching decision for a data cache request associated with the matching trigger pattern.

* * * * *